UNITED STATES PATENT OFFICE.

RUDOLF GARTENMEISTER, OF ELBERFELD, GERMANY.

PROCESS OF PURIFYING CHLORATES.

975,613.  Specification of Letters Patent.  Patented Nov. 15, 1910.

No Drawing.  Application filed August 10, 1908.  Serial No. 447,838.

*To all whom it may concern:*

Be it known that I, RUDOLF GARTENMEISTER, a subject of the German Emperor, and resident of Elberfeld, Germany, have invented certain new and useful Processes of Purifying Chlorates, of which the following is a specification.

This invention relates to a process for the elimination of that impurity, found in chlorates, which has been described by R. Gartenmeister (*Chemiker-Zeitung*, Göthen-Anhalt, 1907, page 174). All commercial chlorates, manufactured by an electrochemical process, as distinguished from chlorates manufactured by the old process, contain as an impurity, a substance which in an acid solution, oxidizes iodid of hydrogen. The supposition was until the present time, that this impurity was a hypochlorite or chlorite (see *Chemiker-Zeitung*, 1908, page 604) but this is no longer admitted. Despite a large amount of recent research, the impurity in question is still of unknown constitution, though it would seem, as deduced from the weight of evidence of such research, to be the potassic salt of another oxychloric acid, from which the mentioned oxychloric acids, adapted to set free iodin, are disengaged. According to the last publication on this matter (Dr. H. Klopztrik, *Chemiker-Zeitung*, 1909, page 21) this impurity might possibly be potassium bromate, $KBrO_3$. That the substance consists of potassium, oxygen, and an uncertain halogen element, and not identical with chlorate of potash, seems to be established. The said disengagement of acid takes place very slowly in the cold and in a very weak acid solution, while it takes place more rapidly at a higher temperature and in presence of greater quantities of free acid. This potassic salt the presence of which is prejudicial when using the chlorates, is eliminated by boiling the solution of the chlorate in which it occurs as an impurity, during a certain space of time with hydrochloric acid in such proportions and diluted to the extent that only the said potassic salt is destroyed but without the loss of essential quantities of chlorate.

The active chlorin compounds generated during the reaction may be eliminated by prolonged boiling or, still more rapidly, by the addition of small quantities of alcohol, or other reducing agents having the same action.

As an example of the manner in which the process is effected, 100 parts of commercial chlorate of potassium, produced by electrolysis, are dissolved in a sufficient quantity of water, to which two parts of hydrochloric acid having the specific weight of 1.19, and three parts of alcohol have been added. The mixture is gently boiled for about an hour. The pure chlorate is removed in the usual manner from the chlorate lye purified in the manner described.

In the case of raw chlorates containing a greater quantity of the potassic salt, the quantity of hydrochloric acid, necessary for the elimination of this impurity, is ascertained by experiment and the solution of the chlorate is treated accordingly.

I claim:—

1. The process of purifying chlorates manufactured by an electro-chemical process, of that impurity of uncertain constitution not identical with potassium chlorate and which is composed of potassium, oxygen, and an uncertain halogen element, which consists in dissolving the chlorate containing the impurity to be eliminated, adding to the solution the amount of hydrochloric acid necessary for effecting the destruction of the impurity, boiling the solution, and removing the chlorate from the solution in the usual manner.

2. The process of purifying chlorates manufactured by an electro-chemical process, of that impurity of uncertain constitution not identical with potassium chlorate and which is composed of potassium, oxygen, and an uncertain halogen element, which consists in dissolving the chlorate containing the impurity to be eliminated, adding to the solution the amount of hydrochloric acid necessary for effecting the destruction of the impurity, adding an agent for the purpose of eliminating the active chlorin formed during the reaction which ensues, boiling the solution, and removing the chlorate from the solution in the usual manner.

3. The process of purifying chlorates manufactured by an electro-chemical process, of that impurity of uncertain constitution not identical with potassium chlorate and which is composed of potassium, oxygen, and an uncertain halogen element, which consists in dissolving the chlorate containing the impurity to be eliminated, adding to the solution the amount of hydrochloric acid necessary for effecting the destruction of the impurity, adding a necessary amount of alcohol for eliminating the active chlorin formed during the reaction which ensues, boiling the solution, and removing the chlorate from the solution in the usual manner.

In testimony whereof I have hereunto set my hand in presence of two witnesses.

RUDOLF GARTENMEISTER. [L. S.]

Witnesses:
WM. WASHINGTON BRUNSWICK,
OTTO KÖNIG.